(12) United States Patent
Kamata

(10) Patent No.: US 10,020,670 B2
(45) Date of Patent: Jul. 10, 2018

(54) POWER RECEIVING DEVICE AND WIRELESS POWER SUPPLY SYSTEM

(71) Applicant: SEMICONDUCTOR ENERGY LABORATORY CO., LTD., Atsugi-shi, Kanagawa-ken (JP)

(72) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 237 days.

(21) Appl. No.: 14/982,331

(22) Filed: Dec. 29, 2015

(65) Prior Publication Data

US 2016/0111896 A1 Apr. 21, 2016

Related U.S. Application Data

(63) Continuation of application No. 13/723,491, filed on Dec. 21, 2012, now Pat. No. 9,231,429.

(30) Foreign Application Priority Data

Dec. 23, 2011 (JP) ................................. 2011-282434

(51) Int. Cl.
*H01F 27/42* (2006.01)
*H02J 7/00* (2006.01)
(Continued)

(52) U.S. Cl.
CPC .............. *H02J 7/025* (2013.01); *H01F 38/14* (2013.01); *H02J 5/005* (2013.01); *H02J 50/12* (2016.02);
(Continued)

(58) Field of Classification Search
CPC ........ H02J 7/00; H02J 7/04; H02J 7/16; H02J 7/025; H02J 5/005
(Continued)

(56) References Cited

U.S. PATENT DOCUMENTS 5,124,699 A 6/1992 Tervoert et al.
5,428,521 A 6/1995 Kigawa et al.
(Continued)

FOREIGN PATENT DOCUMENTS

EP 2372870 A 10/2011
EP 2421121 A 2/2012
(Continued)

OTHER PUBLICATIONS

Kurs.A et al., "Wireless Power Transfer via Strongly Coupled Magnetic Resonances", Science, Jul. 6, 2007, vol. 317, No. 5834, pp. 83-86.
(Continued)

*Primary Examiner* — Thomas Skibinski
(74) *Attorney, Agent, or Firm* — Nixon Peabody LLP; Jeffrey L. Costellia

(57) ABSTRACT

Provided is a power receiving device in which supply of power from a power supply device can be stopped while a reduction in Q-value is suppressed. The power receiving device includes a first antenna which forms resonant coupling with an antenna of the power supply device; a second antenna which forms electromagnetic induction coupling with the first antenna; a rectifier circuit including a plurality of switches and performing a first operation or a second operation depending on whether the plurality of switches is ON or OFF, the first operation being an operation in which voltage applied from the second antenna is rectified to be outputted, and the second operation being an operation in which a pair of power supply points is short-circuited; a load to which the voltage is applied; and a control circuit which generates a signal for selecting ON or OFF of the plurality of switches.

19 Claims, 11 Drawing Sheets

(51) Int. Cl.
*H02J 7/02* (2016.01)
*H01F 38/14* (2006.01)
*H02J 50/80* (2016.01)
*H02J 50/40* (2016.01)
*H02J 50/12* (2016.01)
*H02J 5/00* (2016.01)
*H02M 3/06* (2006.01)
*F02P 3/02* (2006.01)
*H02M 1/12* (2006.01)

(52) U.S. Cl.
CPC ............. *H02J 50/40* (2016.02); *H02J 50/80* (2016.02); *F02P 3/02* (2013.01); *H02M 1/12* (2013.01); *H02M 3/06* (2013.01)

(58) Field of Classification Search
USPC ........ 307/104, 109; 320/108, 166, 167, 161, 320/162, 149
See application file for complete search history.

(56) References Cited

U.S. PATENT DOCUMENTS

| | | | |
|---|---|---|---|
| 5,790,946 A | 8/1998 | Rotzoll | |
| 6,509,217 B1 | 1/2003 | Reddy | |
| 6,737,302 B2 | 5/2004 | Arao | |
| 6,837,438 B1 | 1/2005 | Takasugi et al. | |
| 7,180,421 B2 | 2/2007 | Pahlaven et al. | |
| 7,209,771 B2 | 4/2007 | Twitchell | |
| 7,301,830 B2 | 11/2007 | Takahashi et al. | |
| 7,394,382 B2 | 7/2008 | Nitzan et al. | |
| 8,045,947 B2 | 10/2011 | Mandal et al. | |
| 8,487,481 B2 | 7/2013 | Cook et al. | |
| 8,508,184 B2 | 8/2013 | Sakakibara et al. | |
| 8,519,666 B2 | 8/2013 | Terao et al. | |
| 8,947,041 B2 | 2/2015 | Cook et al. | |
| 9,231,429 B2 * | 1/2016 | Kamata | H02J 7/025 |
| 2002/0049714 A1 | 4/2002 | Yamazaki et al. | |
| 2002/0130675 A1 | 9/2002 | Hiroki | |
| 2002/0132383 A1 | 9/2002 | Hiroki et al. | |
| 2003/0017804 A1 | 1/2003 | Heinrich et al. | |
| 2003/0104848 A1 | 6/2003 | Bridgelall | |
| 2004/0077383 A1 | 4/2004 | Lappetelainen et al. | |
| 2004/0128246 A1 | 7/2004 | Takayama et al. | |
| 2004/0131897 A1 | 7/2004 | Jenson et al. | |
| 2004/0145454 A1 | 7/2004 | Powell et al. | |
| 2005/0020321 A1 | 1/2005 | Rotzoll | |
| 2005/0215119 A1 | 9/2005 | Kaneko | |
| 2005/0254183 A1 | 11/2005 | Ishida et al. | |
| 2006/0009251 A1 | 1/2006 | Noda et al. | |
| 2007/0216348 A1 | 9/2007 | Shionoiri et al. | |
| 2007/0229228 A1 | 10/2007 | Yamazaki et al. | |
| 2007/0229271 A1 | 10/2007 | Shionoiri et al. | |
| 2007/0229279 A1 | 10/2007 | Yamazaki et al. | |
| 2007/0229281 A1 | 10/2007 | Shionoiri et al. | |
| 2007/0278998 A1 | 12/2007 | Koyama | |
| 2007/0285246 A1 | 12/2007 | Koyama | |
| 2008/0210762 A1 | 9/2008 | Osada et al. | |
| 2010/0109443 A1 | 5/2010 | Cook et al. | |
| 2010/0244577 A1 | 9/2010 | Shimokawa | |
| 2010/0244580 A1 | 9/2010 | Uchida et al. | |
| 2010/0259109 A1 | 10/2010 | Sato | |
| 2010/0289449 A1 | 11/2010 | Elo | |
| 2011/0018358 A1 | 1/2011 | Kozakai | |
| 2011/0080053 A1 | 4/2011 | Urano | |
| 2011/0095619 A1 | 4/2011 | Urano | |
| 2011/0101791 A1 | 5/2011 | Urano | |
| 2011/0227421 A1 | 9/2011 | Sakoda et al. | |
| 2011/0270462 A1 | 11/2011 | Amano et al. | |
| 2011/0285211 A1 | 11/2011 | Endo et al. | |
| 2012/0032521 A1 | 2/2012 | Inoue et al. | |
| 2012/0133212 A1 | 5/2012 | Kamata | |
| 2012/0161529 A1 | 6/2012 | Kamata et al. | |
| 2013/0082648 A1 | 4/2013 | Kamata | |
| 2013/0119776 A1 | 5/2013 | Kamata | |
| 2013/0147281 A1 | 6/2013 | Kamata | |
| 2013/0154385 A1 | 6/2013 | Miwa et al. | |
| 2013/0154556 A1 | 6/2013 | Takahashi et al. | |

FOREIGN PATENT DOCUMENTS

| | | |
|---|---|---|
| JP | 2002-101578 A | 4/2002 |
| JP | 2006-180073 A | 7/2006 |
| JP | 2010-119246 A | 5/2010 |
| JP | 2010-130878 A | 6/2010 |
| JP | 2010-193598 A | 9/2010 |
| JP | 2010-219838 A | 9/2010 |
| JP | 2010-226890 A | 10/2010 |
| JP | 2010-239690 A | 10/2010 |
| JP | 2010-239769 A | 10/2010 |
| JP | 2010-252446 A | 11/2010 |
| JP | 2010-252468 A | 11/2010 |
| JP | 2011-029799 A | 2/2011 |
| JP | 2011-114985 A | 6/2011 |
| JP | 2011-182506 A | 9/2011 |
| JP | 2011-234496 A | 11/2011 |
| JP | 2011-244684 A | 12/2011 |
| WO | WO-2010/055381 | 5/2010 |
| WO | WO-2010/064584 | 6/2010 |
| WO | WO-2010/119577 | 10/2010 |
| WO | WO-2011/135424 | 11/2011 |
| WO | WO-2012/070634 | 5/2012 |

OTHER PUBLICATIONS

Miyamoto.T et al., "Wireless Power Transfer System with a Simple Receiver Coil", IMWS 2011 (2011 IEEE MTT-S International Microwave Workshop Series), May 12, 2011, pp. 131-134.

Karalis.A et al., "Efficient wireless non-radiative mid-range energy transfer", Annals of Physics, 2008, vol. 323, pp. 34-48.

* cited by examiner

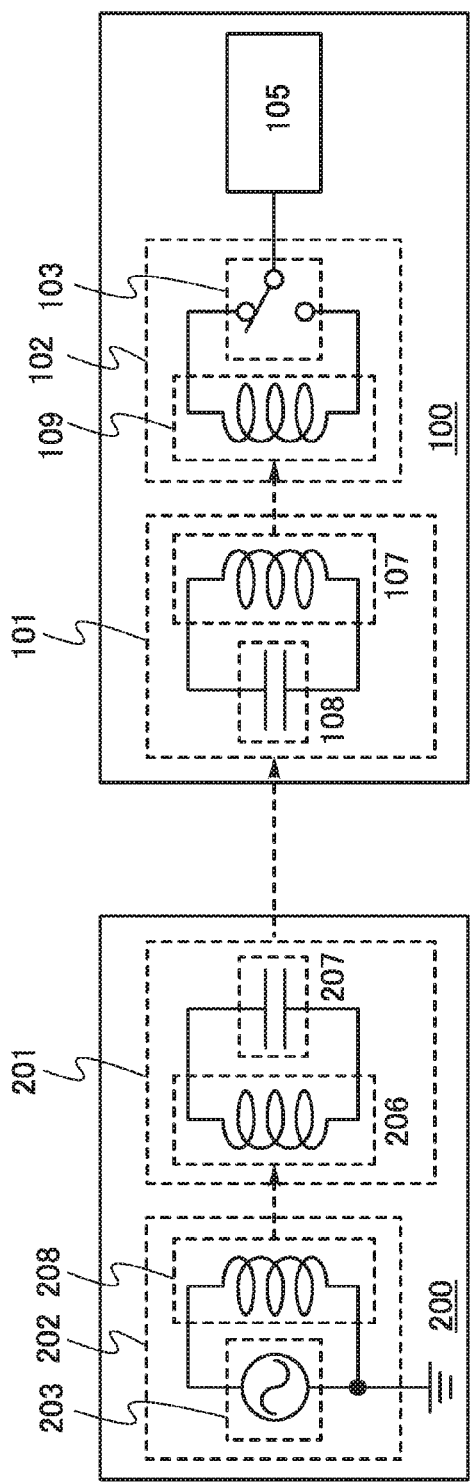
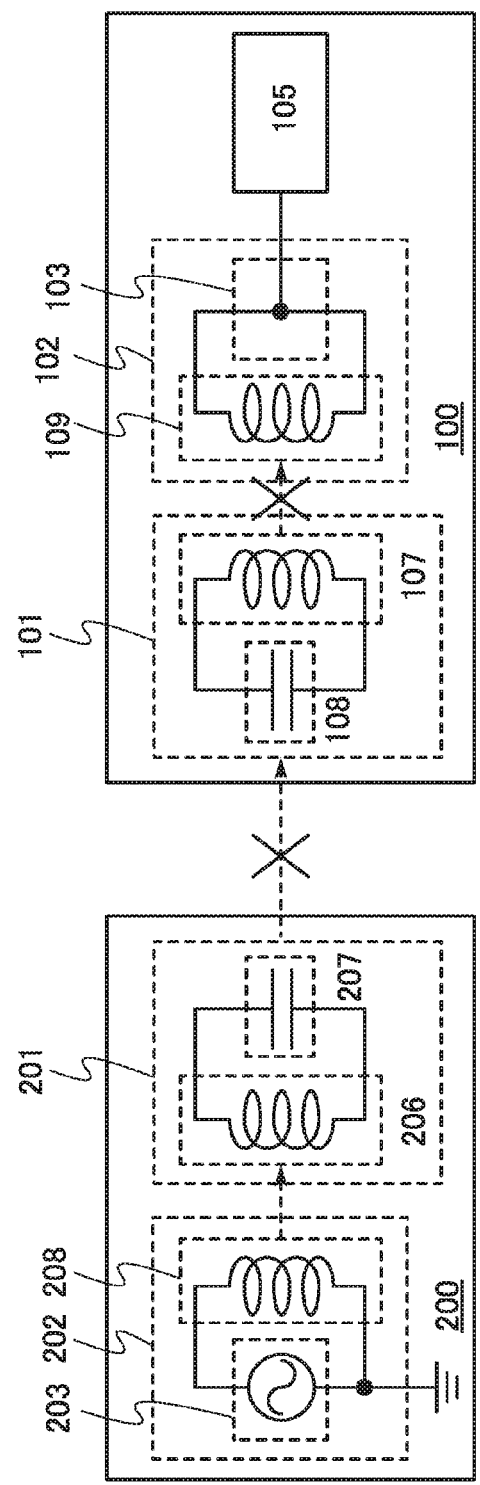
FIG. 4A
FIG. 4B

POWER RECEIVING DEVICE AND WIRELESS POWER SUPPLY SYSTEM

BACKGROUND OF THE INVENTION

1. Field of the Invention

The present invention relates to a power receiving device that wirelessly receives power, a wireless power supply system including the power receiving device, and a wireless power supply method.

2. Description of the Related Art

A wireless power supply technique for wirelessly supplying power from a power supply device to a power receiving device by electromagnetic induction has been developed and come into practical use. In recent years, a wireless power supply technique for supplying power by electromagnetic resonance (electromagnetic resonant coupling) that enables long-distance power transmission as compared to a wireless power supply technique for supplying power by electromagnetic induction has attracted attention. Unlike by electromagnetic induction, by electromagnetic resonance, high power transmission efficiency can be maintained even when the transmission distance is several meters, and power loss due to misalignment of an antenna of a power supply device and an antenna of a power receiving device can be reduced.

Patent Document 1 and Non-Patent Document 1 disclose wireless power supply techniques utilizing electromagnetic resonance.

In electromagnetic resonant wireless power supply disclosed in Patent Document 1 and Non-Patent Document 1, a power supply device and a power receiving device each include two antennas. Specifically, the power supply device includes an antenna to which power is supplied from a power source through a contact and a resonant antenna that is coupled with the antenna by electromagnetic induction. Further, the power receiving device includes a power receiving antenna for supplying power to a load through a contact and a resonant antenna that is coupled with the antenna by electromagnetic induction. When the resonant antenna of the power supply device and the resonant antenna of the power receiving device are coupled with each other by magnetic resonance or electric field resonance, power is wirelessly supplied from the power supply device to the power receiving device.

REFERENCE

[Patent Document 1] Japanese Published Patent Application No. 2010-219838.
[Non-Patent Document 1] Andre Kurs et al., "Wireless Power Transfer via Strongly Coupled Magnetic Resonances", *Science*, Jul. 6, 2007, Vol. 317, pp. 83-86.

SUMMARY OF THE INVENTION

Further, in electromagnetic resonance, as described above, the transmission distance can be set to be long and the allowable range of positional deviation between resonant antennas is wide. Therefore, restriction on a positional relation between a power supply device and a power receiving device is smaller in electromagnetic resonance than in electromagnetic induction, which is advantageous when power is supplied to a plurality of power receiving devices. However, in the case of a plurality of power receiving devices, even when the resonance frequency of the power supply device is equal to that of the power receiving device, power transmission efficiency of the total power transmitted from the power supply device to the plurality of power receiving devices is lower than in the case where one power supply device is paired with one power receiving device because resonant antennas of the plurality of power receiving devices interfere with each other. Further, in a power receiving device in which charging is completed and supply of power is unnecessary, a circuit element, a wiring, and the like that are connected to a power receiving antenna are charged and discharged, which causes power consumption. In addition, supply of power from the power supply device to the power receiving device in which charging is completed is not stopped, whereby transmission efficiency of power supplied to a power receiving device while charging remains low.

One of effective methods to increase power transmission efficiency is to short-circuit a pair of power supply points of a coil of a resonant antenna in the power receiving device in which charging is completed of the plurality of power receiving devices by a switch. When the pair of power supply points of the coil is short-circuited, magnetic resonant coupling or electric field resonant coupling formed between a resonant antenna of the power supply device and the resonant antenna of the power receiving device can be decoupled. Accordingly, the power receiving device in which charging is completed hardly inhibits magnetic resonance coupling or electric field resonance coupling between the power supply device and another power receiving device, which leads to an increase in power transmission efficiency.

However, in this method, it is necessary to provide, in the resonant antenna, a switch for a short circuit and a wiring, a circuit element, and the like for selecting ON or OFF of the switch, which causes an increase in resistance of the whole resonant antenna. Therefore, it cannot be said that the above method is preferable because in electromagnetic resonance, Q-value is reduced due to an increase in resistance of the whole resonant antenna to decrease power transmission efficiency.

In view of the foregoing technical background, an object of one embodiment of the present invention is to provide a power receiving device in which supply of power from a power supply device can be stopped while a reduction in Q-value is suppressed. Further, an object of the present invention is to propose a wireless power supply system with high efficiency of power transmission or a wireless power supply method with high efficiency of power transmission, in which the power receiving device is used.

In one embodiment of the present invention, a pair of power supply points of an antenna element of a power receiving antenna in a power receiving device is short-circuited using a rectifier circuit of the power receiving device. Specifically, the rectifier circuit includes one or more switches for electrically connecting the pair of power supply points to each other. Any of the one or more switches is ON, so that the pair of power supply points of the antenna element can be short-circuited. Further, in the rectifier circuit, any of the one or more switches is ON or OFF in accordance with AC voltage generated by an AC power source of the power supply device, so that the potential of one of the power supply points of the antenna element is outputted from the rectifier circuit.

More specifically, a power receiving device according to one embodiment of the present invention includes a first antenna which forms magnetic resonance coupling or electric field resonance (hereinafter simply referred to as resonance) coupling with an antenna of the power supply device; a second antenna which forms electromagnetic induction coupling with the first antenna; a rectifier circuit including a plurality of switches and performing a first operation or a second operation depending on whether each of the plurality of switches is ON or OFF, the first operation being an operation in which voltage applied from the second antenna is rectified to be outputted, and the second operation being an operation in which a pair of power supply points of an antenna element of the second antenna is short-circuited; a load to which the voltage outputted from the rectifier circuit is applied; and a control circuit which generates a signal for selecting ON or OFF of each of the plurality of switches in the first operation and the second operation by the rectifier circuit.

Further, the power receiving device according to one embodiment of the present invention may include a receiving circuit which wirelessly receives a signal including, as data, a cycle of the AC voltage generated in the power supply device. The receiving circuit includes an antenna, a rectifier circuit, a demodulation circuit, and the like. With the use of the signal including the cycle of the AC voltage as data, the control circuit generates a signal for selecting ON or OFF of each of the plurality of switches in the rectifier circuit in the first operation in accordance with the cycle of the AC voltage generated in the power supply device.

Further, the power receiving device according to one embodiment of the present invention may include a power storage device such as a secondary battery or a capacitor as the load. The control circuit generates a signal for selecting ON or OFF of each of the plurality of switches so that the rectifier circuit performs the first operation while charging of the power storage device is performed. Further, the control circuit generates a signal for selecting ON or OFF of each of the plurality of switches so that the rectifier circuit performs the second operation while charging of the power storage device is not performed.

In the power receiving device according to one embodiment of the present invention, the pair of power supply points of the antenna element of the power receiving antenna is short-circuited. With the above structure, supply of power to a circuit element, a wiring, and the like that are connected to the power receiving antenna is stopped; therefore, the resonant antenna of the power receiving device does not substantially receive power from the resonant antenna of the power supply device. Therefore, in the power receiving device according to one embodiment of the present invention, supply of power from the power supply device can be stopped without a short-circuit between the pair of power supply points of the antenna element of the resonant antenna. Further, in a wireless power supply system or a wireless power supply method according to one embodiment of the present invention, the stop of the supply of power from the power supply device to the power receiving device in which charging is completed can improve power transmission efficiency from the power supply device to another power receiving device.

In one embodiment of the present invention, with the above structure, a power receiving device in which supply of power from a power supply device can be stopped while a reduction in Q-value is suppressed can be provided. Further, in one embodiment of the present invention, a wireless power supply system with high efficiency of power transmission or a wireless power supply method with high efficiency of power transmission, in which the power receiving device is used, can be provided.

BRIEF DESCRIPTION OF THE DRAWINGS

FIGS. 4A and 4B show conceptual diagrams each illustrating operation of a wireless power supply system.

DETAILED DESCRIPTION OF THE INVENTION

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Therefore, the present invention should not be interpreted as being limited to the description in the following embodiments.

(Embodiment 1)

Figure 1:
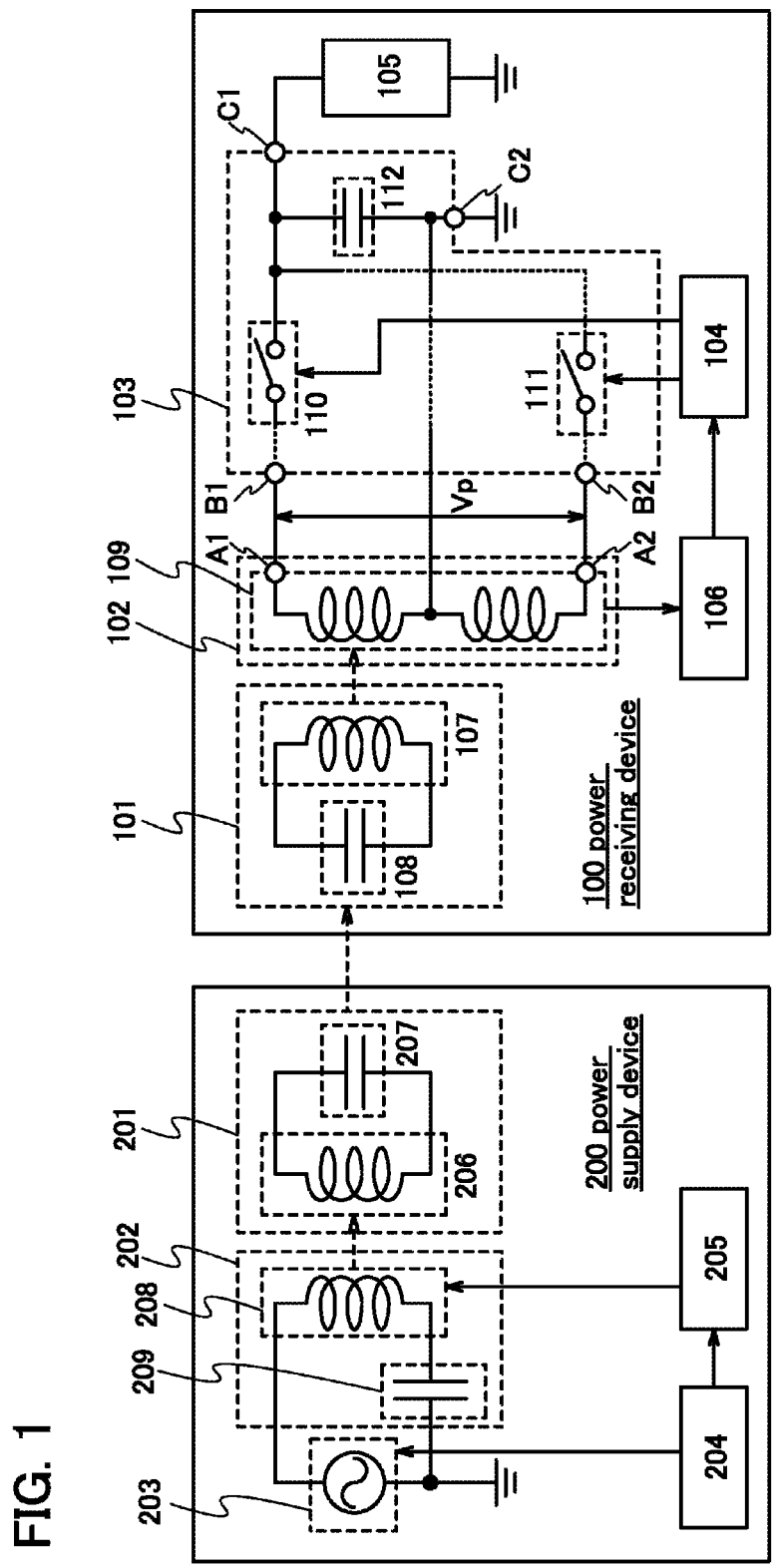
FIG. 1 illustrates a structure of a wireless power supply system.

FIG. 1 illustrates an example of a wireless power supply system according to one embodiment of the present invention. The wireless power supply system in FIG. 1 includes a power receiving device 100 and a power supply device 200.

The power receiving device 100 includes a resonant antenna 101, a power receiving antenna 102, a rectifier circuit 103, a control circuit 104, a load 105, and a receiving circuit 106. Further, the power supply device 200 includes a resonant antenna 201, an antenna 202, an AC power source 203, a control circuit 204, and a transmitting circuit 205.

First, a specific structure of the power supply device 200 is described.

The resonant antenna 201 includes an antenna element 206 that is an inductor and capacitance in the antenna element 206. Further, in order to adjust the resonant frequency of the resonant antenna 201, a capacitor may be connected to the antenna element 206 in addition to the capacitance in the antenna element 206. In FIG. 1, the capacitance in the antenna element 206 and the capacitor for adjusting the resonant frequency are collectively referred to as a capacitor 207. The resonant antenna 201 in FIG. 1 is shown in an equivalent circuit in which the antenna element 206 and the capacitor 207 are connected to each other.

The antenna element 206 can be a spiral conductor, a loop conductor, a helical conductor, or the like. The inductance of the antenna element 206 and the capacitance of the capacitor 207 are set so that the resonant frequency of the resonant antenna 201 is equal to the resonant frequency of the resonant antenna 101 of the power receiving device 100. With the above structure, resonant coupling can be formed between the resonant antenna 201 and the resonant antenna 101. Note that resonant coupling means a state in which power or a signal is wirelessly transmitted and received by resonance.

The antenna 202 includes an antenna element 208 that is an inductor. A capacitance may exist in the antenna element 208 or a capacitor may be connected to the antenna element

208. In FIG. 1, the capacitance in the antenna element 208 and the capacitor for adjusting the resonant frequency are collectively referred to as a capacitor 209. The antenna 202 in FIG. 1 is shown in an equivalent circuit in which the antenna element 208 and the capacitor 209 are connected to each other.

Further, as in the antenna element 206, the antenna element 208 can be a spiral conductor, a loop conductor, a helical conductor, or the like. Note that in the antenna 202, the shape (e.g., diameter) of the antenna element 208 and the positional relationship between the antenna element 206 and the antenna element 208 are set so that the magnitude of magnetic flux that is outputted from the antenna 202, is interlinked with the resonant antenna 201, and contributes to induced electromotive force in the resonant antenna 201, that is, the magnitude of main magnetic flux increases. Specifically, it is preferable that the diameter of the antenna element 208 be larger than a distance between the antenna element 206 and the antenna element 208 in order to improve power transmission efficiency between the resonant antenna 201 and the antenna 202. With the above structure, electromagnetic induction coupling can be formed between the antenna 202 and the resonant antenna 201. Note that electromagnetic induction coupling means a state in which power or a signal is wirelessly transmitted and received by electromagnetic induction.

The AC power source 203 has a function of supplying AC voltage to the antenna 202. A cycle of the AC voltage which is supplied from the AC power source 203 to the antenna 202 is controlled by the control circuit 204. The transmitting circuit 205 has a function of wirelessly transmitting a signal including the cycle as data to the power receiving device 100 when the signal is supplied from the control circuit 204. Specifically, the transmitting circuit 205 includes a modulation circuit or the like and, by applying modulation to AC voltage applied to the antenna 202, superimposes the signal including the cycle as data on a radio wave transmitted from the antenna 202.

Next, a specific structure of the power receiving device 100 is described.

The resonant antenna 101 includes an antenna element 107 that is an inductor and capacitance in the antenna element 107. Further, in order to adjust the resonant frequency of the resonant antenna 101, a capacitor may be connected to the antenna element 107 in addition to the capacitance in the antenna element 107. In FIG. 1, the capacitance in the antenna element 107 and the capacitor for adjusting the resonant frequency are collectively referred to as a capacitor 108. The resonant antenna 101 in FIG. 1 is shown in an equivalent circuit in which the antenna element 107 and the capacitor 108 are connected to each other.

The antenna element 107 can be a spiral conductor, a loop conductor, a helical conductor, or the like. The inductance of the antenna element 107 and the capacitance of the capacitor 108 are set so that the resonant frequency of the resonant antenna 101 is equal to the resonant frequency of the resonant antenna 201 of the power supply device 200. With the above structure, resonant coupling can be formed between the resonant antenna 101 and the resonant antenna 201.

The power receiving antenna 102 includes an antenna element 109 that is an inductor. As in the antenna element 107, a capacitance may exist in the antenna element 109 or a capacitor may be connected to the antenna element 109. Further, as in the antenna element 107, the antenna element 109 can be a spiral conductor, a loop conductor, a helical conductor, or the like. Note that in the power receiving antenna 102, the shape (e.g., diameter) of the antenna element 109 and the positional relationship between the antenna element 107 and the antenna element 109 are set so that the magnitude of magnetic flux that is outputted from the resonant antenna 101, is interlinked with the power receiving antenna 102, and contributes to induced electromotive force in the power receiving antenna 102, that is, the magnitude of main magnetic flux increases. Specifically, it is preferable that the diameter of the antenna element 109 be larger than a distance between the antenna element 107 and the antenna element 109 in order to improve power transmission efficiency between the resonant antenna 101 and the power receiving antenna 102. With the above structure, electromagnetic induction coupling can be formed between the power receiving antenna 102 and the resonant antenna 101.

Power supply points A1 and A2 of the power receiving antenna 102 are connected to input terminals B1 and B2 of the rectifier circuit 103, respectively. Accordingly, the potential of the power supply point A1 is applied to the input terminal B1 and the potential of the power supply point A2 is applied to the input terminal B2.

Note that the term "connection" in this specification refers to electrical connection through a contact and corresponds to the state in which current, a potential, or voltage can be supplied or transmitted through a contact. Accordingly, a connection state means not only a state of a direct connection but also a state of indirect connection through a circuit element such as a wiring, a resistor, a diode, or a transistor so that current, a potential, or voltage can be supplied or transmitted.

The rectifier circuit 103 includes a plurality of switches. FIG. 1 illustrates a specific example in which the rectifier circuit 103 includes switches 110 and 111. Further, the rectifier circuit 103 includes a capacitor 112 in FIG. 1. Note that the rectifier circuit 103 may further include another circuit element such as a transistor, a diode, a resistor, a capacitor, or an inductor as needed.

The switch 110 has a function of controlling connection between the input terminal B1 and an output terminal C1 of the rectifier circuit 103. That is, when the switch 110 is ON, the potential of the power supply point A1 applied to the input terminal B1 is applied to the output terminal C1 through the switch 110. When the switch 110 is OFF, the potential of the power supply point A1 applied to the input terminal B1 is not applied to the output terminal C1.

Further, the switch 111 has a function of controlling connection between the input terminal B2 and the output terminal C1 of the rectifier circuit 103. That is, when the switch 111 is ON, the potential of the power supply point A2 applied to the input terminal B2 is applied to the output terminal C1 through the switch 111. When the switch 111 is OFF, the potential of the power supply point A2 applied to the input terminal B2 is not applied to the output terminal C1 through the switch 111.

In one embodiment of the present invention, the rectifier circuit 103 can perform two operations by selection of ON or OFF of each of the plurality of switches.

First, in a first operation, one of the switches 110 and 111 and the other thereof are alternately ON and OFF, repeatedly, whereby AC voltage applied between the power supply points A1 and A2 is rectified. Switching of ON and OFF of the switches 110 and 111 is performed in accordance with the cycle of the AC voltage applied between the power supply points A1 and A2. DC voltage that can be obtained by rectification of the AC voltage is applied between the output terminal C1 and an output terminal C2.

One of electrodes of the capacitor 112 is connected to the output terminal C1 and the other of the electrodes of the capacitor 112 is connected to the output terminal C2. Further, a reference potential such as a ground potential is applied to the output terminal C2 and a potential difference between the output terminals C1 and C2 is smoothed by the capacitor 112. Accordingly, the smoothed potential difference between the output terminals C1 and C2 is applied to the load 105 as AC voltage.

Further, in a second operation, the switches 110 and 111 are ON, so that the power supply points A1 and A2 are short-circuited. When the power supply points A1 and A2 are short-circuited, the potentials of the power supply points A1 and A2 are substantially equal to the reference potential applied to the output terminal C2. Therefore, in one embodiment of the present invention, when the second operation is performed in the rectifier circuit 103, supply of power to the rectifier circuit 103, the load 105, another circuit element, another wiring, and the like that are connected to the power receiving antenna 102 can be stopped. Accordingly, resonant coupling is not substantially formed between the resonant antenna 101 of the power receiving device 100 and the resonant antenna 201 of the power supply device 200.

The plurality of switches of the rectifier circuit 103 is controlled in response to a signal for selecting ON or OFF that is transmitted from the control circuit 104. Therefore, when the plurality of switches of the rectifier circuit 103 is controlled by the control circuit 104, whether the first operation or the second operation is performed in the rectifier circuit 103 is selected. Specifically, in the case where power is wirelessly supplied from the power supply device 200 to the power receiving device 100, the first operation is performed in the rectifier circuit 103 in response to a signal from the control circuit 104. Further, in the case where wireless power supply from the power supply device 200 to the power receiving device 100 is stopped, the second operation is performed in the rectifier circuit 103 in response to a signal from the control circuit 104.

Note that the signal for controlling the plurality of switches in the control circuit 104 may be generated in response to a command inputted from an input device or the like or a signal from the load 105. Note that the input of a command from the input device may be performed manually or performed in accordance with a distance between another electronic device and the power receiving device 100 which is detected by a mechanism provided in the input device.

The receiving circuit 106 receives the signal including the cycle of the AC voltage as data and transmitted from the transmitting circuit 205. Specifically, the receiving circuit 106 includes a demodulation circuit or the like and has a function of extracting the signal including, as data, the cycle from AC voltage received by the power receiving antenna 102.

Then, the signal received by the receiving circuit 106 is applied to the control circuit 104. In the control circuit 104, when AC voltage is rectified in the first operation, the switching of ON and OFF of the switches 110 and 111 is determined using the signal from the receiving circuit 106.

Note that FIG. 1 illustrates an example in which a signal is transmitted and received between the transmitting circuit 205 and the receiving circuit 106 through a group of antennas for supplying power, that is, the antenna 202, the resonant antenna 201, the resonant antenna 101, and the power receiving antenna 102. However, in one embodiment of the present invention, a signal may be transmitted and received between the transmitting circuit 205 and the receiving circuit 106 by a group of antennas different from the group of antennas for supplying power.

Figure 2:
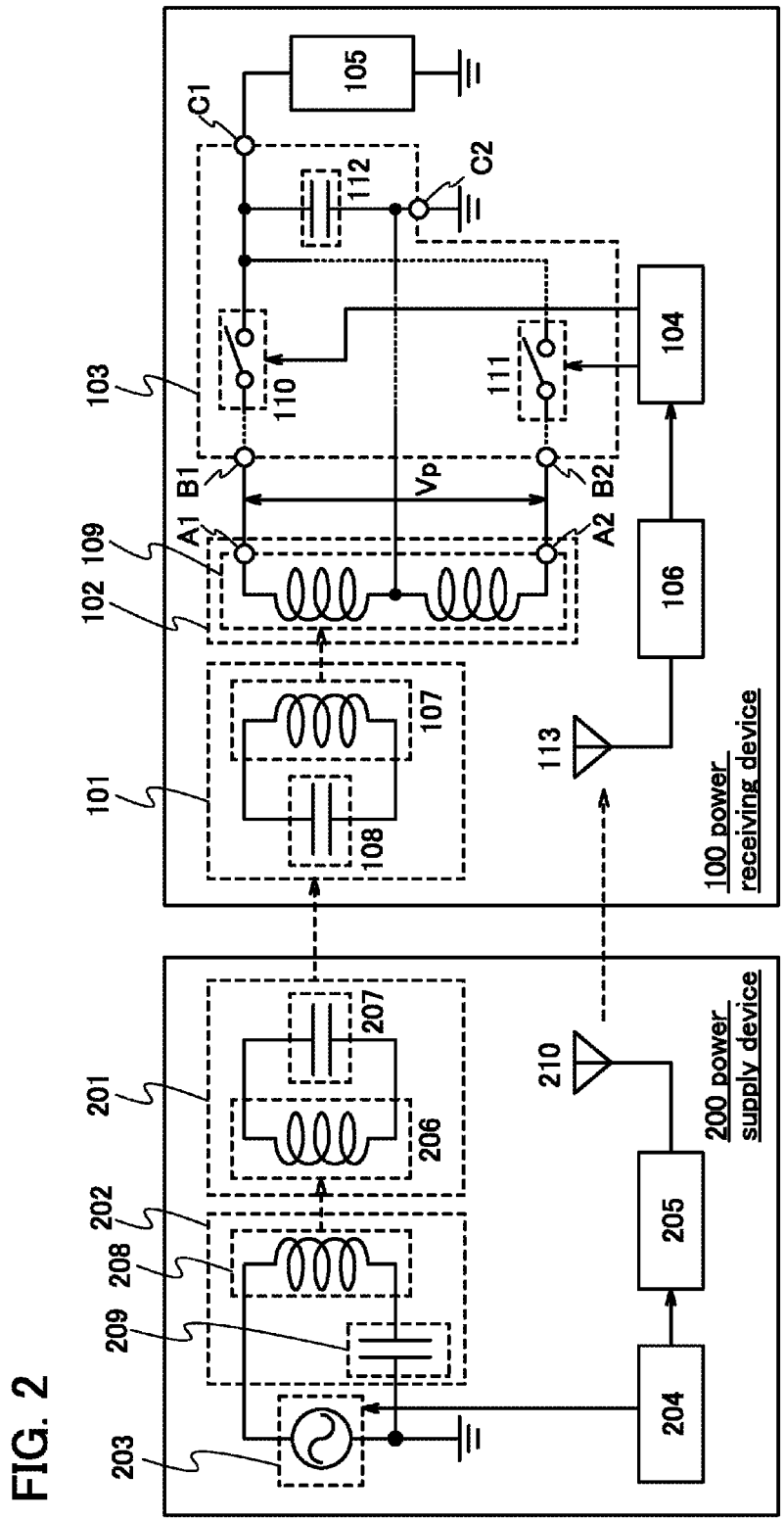
FIG. 2 illustrates a structure of a wireless power supply system.

FIG. 2 illustrates an example of a wireless power supply system according to one embodiment of the present invention in the case where a signal is transmitted and received between the transmitting circuit 205 and the receiving circuit 106 by a group of antennas different from the group of antennas for supplying power. The wireless power supply system in FIG. 2 is different from the wireless power supply system in FIG. 1 in that an antenna 210 connected to the transmitting circuit 205 and an antenna 113 connected to the receiving circuit 106 are additionally provided.

In FIG. 2, the transmitting circuit 205 includes at least an oscillator circuit in addition to the modulation circuit. In the transmitting circuit 205, the modulation circuit modulates AC voltage outputted from the oscillator circuit, whereby the signal including the cycle of the AC voltage as data is superimposed on a radio wave outputted from the antenna 210. When the antenna 113 receives the radio wave, AC voltage generated by reception of the radio wave is transmitted to the receiving circuit 106. The receiving circuit 106 in FIG. 2 includes a demodulation circuit or the like as in FIG. 1. The receiving circuit 106 has a function of extracting the signal including, as data, the cycle from the AC voltage transmitted from the antenna 113.

Note that in FIG. 2, the antenna 210 and the antenna 113 may each have an antenna or a plurality of antennas.

Alternatively, modulation may be applied to a carrier wave between the resonant antenna 101 of the power receiving device 100 and the resonant antenna 201 of the power supply device 200 with the antenna 210, whereby a signal is transmitted from the transmitting circuit 205 to the receiving circuit 106. In this case, since a signal is transmitted from the power receiving antenna 102 to the receiving circuit 106, the antenna 113 is not needed.

Further, in one embodiment of the present invention, the transmission of a signal from the transmitting circuit 205 to the receiving circuit 106 can be performed by a communication method in accordance with an existing communication standard, for example, infrared communication, a near field communication method, or the like.

In the wireless power supply systems according to one embodiment of the present invention which are illustrated as examples in FIG. 1 and FIG. 2, the power supply device 200 is provided with the antenna 202, whereby the resonant antenna 201 is not in contact with the AC power source 203. With the above structure, in the power supply device 200, the resonant antenna 201 can be electrically isolated from the internal resistance of the AC power source 203. Further, the power receiving device 100 is provided with the power receiving antenna 102, whereby the resonant antenna 101 is not in contact with the rectifier circuit 103 or the load 105. With the above structure, in the power receiving device 100, the resonant antenna 101 can be electrically isolated from the internal resistance of the rectifier circuit 103 or the load 105. Thus, as compared to the case where the resonant antenna 201 is connected to the AC power source 203 or the case where the resonant antenna 101 is connected to the rectifier circuit 103 or the load 105, the Q-values of the resonant antenna 201 and the resonant antenna 101 are increased. Consequently, power transmission efficiency can be improved.

Next, the first operation and the second operation of the power receiving device 100 according to one embodiment of the present invention are specifically described using the wireless power supply system in FIG. 1 as an example.

First, when AC voltage is outputted from the AC power source 203 in the power supply device 200, the power is wirelessly supplied to the resonant antenna 201 by electromagnetic induction coupling between the antenna 202 and the resonant antenna 201. Then, the power supplied to the resonant antenna 201 is wirelessly supplied to the resonant antenna 101 by resonant coupling between the resonant antenna 201 and the resonant antenna 101. Further, the power supplied to the resonant antenna 101 is supplied to the power receiving antenna 102 by electromagnetic induction coupling between the resonant antenna 101 and the power receiving antenna 102.

Figure 3A:
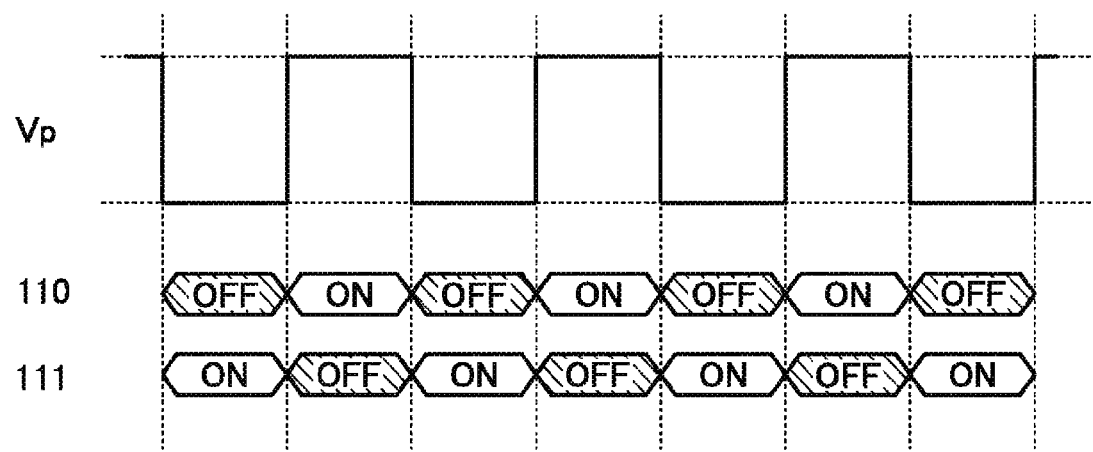
FIGS. 3A and 3B each show a timing chart.

In the case where the first operation is performed in the rectifier circuit 103 of the power receiving device 100, the switches 110 and 111 operate in accordance with a timing chart in FIG. 3A. In FIG. 3A, a potential difference between the power supply points A1 and A2 when the potential of the power supply point A2 is regarded as a reference potential in the power receiving antenna 102 is shown as voltage $V_p$.

According to the timing chart in FIG. 3A, when the voltage $V_p$ is low-level voltage, that is, when the potential of the power supply point A2 is higher than that of the power supply point A1, the switch 110 is OFF and the switch 111 is ON. Accordingly, the potential of the power supply point A2, which is higher than that of the power supply point A1, is applied to the output terminal C1 through the switch 111. Further, according to the timing chart in FIG. 3A, when the voltage $V_p$ is high-level voltage, that is, when the potential of the power supply point A1 is higher than that of the power supply point A2, the switch 110 is ON and the switch 111 is OFF. Accordingly, the potential of the power supply point A1 that is higher than that of the power supply point A2 is applied to the output terminal C1 through the switch 110.

By the above first operation, a potential that is higher than the potential of the output terminal C2 is applied to the output terminal C1. That is, by the above first operation, the AC voltage $V_p$ applied between the power supply points A1 and A2 is rectified and then DC voltage is applied between the output terminals C1 and C2. The DC voltage applied between the output terminals C1 and C2 is supplied to the load 105.

In the above first operation, the switching of ON and OFF of the switches 110 and 111 can be determined in the control circuit 104 in accordance with the cycle of the AC voltage outputted from the AC power source 203 of the power supply device 200.

FIG. 4A schematically illustrates flow of power in the wireless power supply system in the case where the above first operation is performed. Note that in FIG. 4A, the switches 110 and 111 in the rectifier circuit 103 are illustrated as a single pole double throw switch. As shown in FIG. 4A, when the rectifier circuit 103 performs the first operation, power wirelessly transmitted from the power supply device 200 is supplied to the load 105.

Note that the power receiving device 100 may have a mechanism for monitoring voltage outputted from the rectifier circuit 103 in order to confirm whether or not the AC voltage is rectified in the rectifier circuit 103 in the above first operation. In this case, for example, the power receiving device 100 may be provided with an analog-to-digital converter for converting a voltage value outputted from the rectifier circuit 103 from analog to digital. By a comparison of the measured voltage value that is digitized by the analog-to-digital converter and a reference voltage value in the control circuit 104, whether or not the operations of the switches 110 and 111 are synchronized with the cycle of the AC voltage applied from the power supply device 200 can be determined. When it is determined that the operations of the switches 110 and 111 are not synchronized with the cycle of the AC voltage, the switching of ON and OFF of the switches 110 and 111 may be adjusted in the control circuit 104 such that the operations of the switches 110 and 111 are synchronized with the cycle of the AC voltage.

Further, in one embodiment of the present invention, the length of the period during which one of the switches 110 and 111 is ON is adjusted in the rectifier circuit 103, whereby the magnitude of the voltage outputted from the rectifier circuit 103 can be controlled. For example, the magnitude of the voltage may be controlled in accordance with change in impedance of the load 105.

Figure 3B:
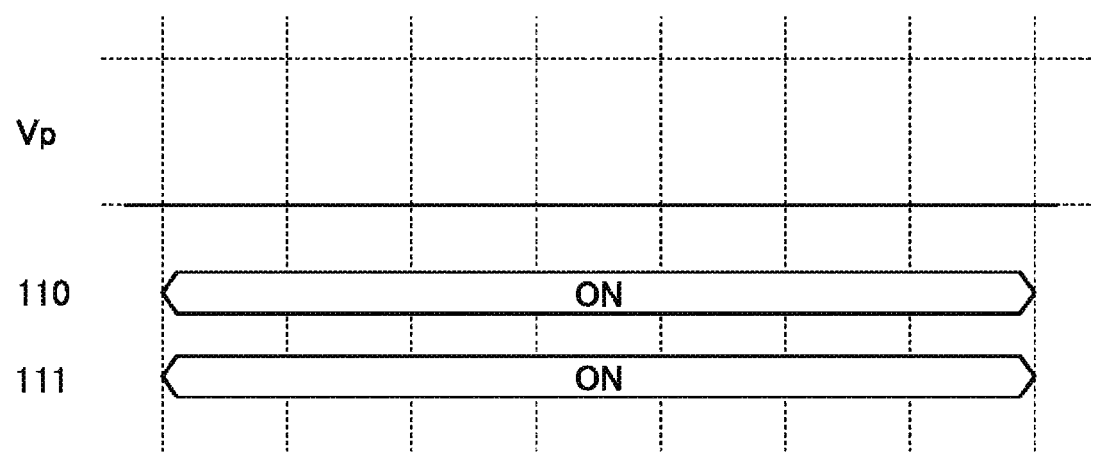

Next, in the case where the second operation is performed in the rectifier circuit 103 of the power receiving device 100, the switches 110 and 111 operate in accordance with a timing chart in FIG. 3B. In FIG. 3B, as in FIG. 3A, a potential difference between the power supply points A1 and A2 when the potential of the power supply point A2 is regarded as a reference potential in the power receiving antenna 102 is shown as voltage $V_p$.

According to the timing chart in FIG. 3B, the switches 110 and 111 are kept ON. Therefore, since the power supply points A1 and A2 are short-circuited by the second operation, the voltage $V_p$ is substantially equal to zero. Supply of power to a circuit element or a wiring that is connected to the power receiving antenna 102, specifically, the capacitor 112 in the rectifier circuit 103, the circuit elements forming the load 105, the wiring provided in the rectifier circuit 103 or the load 105, and the like is stopped. Therefore, the resonant antenna 101 of the power receiving device 100 does not substantially receive power from the resonant antenna 201 of the power supply device 200.

FIG. 4B schematically illustrates flow of power in the wireless power supply system in the case where the above second operation is performed. Note that FIG. 4B illustrates a state where the pair of power supply points of the antenna element 109 of the power receiving antenna 102 in the rectifier circuit 103 are connected using a wiring. As shown in FIG. 4B, in the case where the rectifier circuit 103 performs the second operation, resonant coupling is not substantially formed between the resonant antenna 101 of the power receiving device 100 and the resonant antenna 201 of the power supply device 200. Accordingly, power wirelessly transmitted from the power supply device 200 is not supplied to the load 105.

Therefore, in one embodiment of the present invention, in the power receiving device 100, supply of power from the power supply device 200 can be stopped without a short-circuit between the pair of power supply points of the antenna element 107 of the resonant antenna 101. Further, the stop of the supply of power from the power supply device 200 to the power receiving device 100 in which charging is completed can improve power transmission efficiency from the power supply device 200 to another power receiving device.

(Embodiment 2)

In this embodiment, the structure of the power receiving device 100 which uses a power storage device as the load 105 is described.

Figure 5:
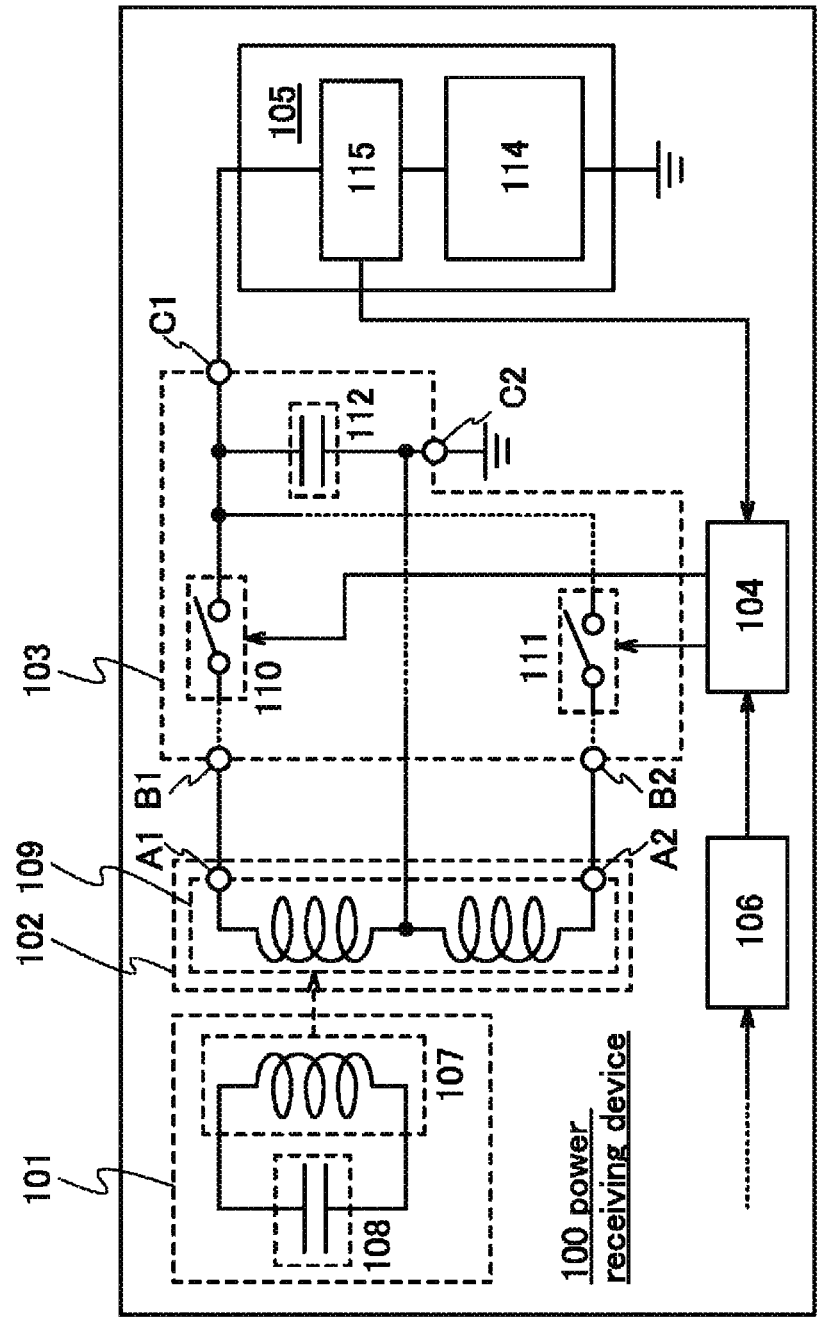
FIG. 5 illustrates a structure of a power receiving device.

FIG. 5 illustrates the structure of the power receiving device 100 according to one embodiment of the present invention. The power receiving device 100 in FIG. 5 is different from the power receiving devices 100 in FIG. 1 and FIG. 2 in the structure of the load 105. In FIG. 5, the load 105 includes a power storage device 114 and a charge control circuit 115. Note that the load 105 may include a load in addition to the power storage device 114 and the charge control circuit 115.

Current is supplied to the power storage device 114 using voltage transmitted from the rectifier circuit 103, whereby charge is stored in the power storage device 114; therefore, power is stored in the power storage device 114. The power storage device 114 includes at least a pair of input terminals; charge is supplied from one input terminal and a reference potential such as a ground potential is applied to the other input terminal. When charging is completed and charge is sufficiently stored in the power storage device 114, that is, when the power storage device 114 is fully charged, voltage between the input terminals reaches a predetermined value Vos.

Note that it can be assumed that determination whether the power storage device 114 is fully charged or not depends on the practitioner. The value of voltage Vos may be set as appropriate by the practitioner.

A secondary battery, a capacitor, or the like can be used as the power storage device 114. As the secondary battery, for example, a lead-acid battery, a nickel-cadmium battery, a nickel-hydride battery, a lithium-ion battery, or the like can be used. Further, the capacitor can be, for example, an electric double layer capacitor, or a hybrid capacitor in which one of a pair of electrodes has an electric double layer structure and the other utilizes an oxidation-reduction reaction. The hybrid capacitor, for example, includes a lithium ion capacitor in which a positive electrode has an electric double layer structure, and a negative electrode has a lithium ion secondary battery structure.

The charge control circuit 115 has a function of preventing the power storage device 114 from being charged after the power storage device 114 is fully charged, that is, from being overcharged. Specifically, when the voltage between the pair of input terminals reaches the predetermined value Vos, the charge control circuit 115 determines that the power storage device 114 is fully charged, and stops supply of current to the power storage device 114.

Further, in one embodiment of the present invention, the rectifier circuit 103 can be switched from the first operation to the second operation using information that the power storage device 114 is fully charged. Specifically, the charge control circuit 115 notifies the control circuit 104 of the information that the power storage device 114 is fully charged. In the control circuit 104, when the above information is notified, a signal for controlling whether each of the switches 110 and 111 is ON or OFF is generated so that the rectifier circuit 103 is switched from the first operation to the second operation. When the second operation is performed in the rectifier circuit 103, the resonant antenna 101 of the power receiving device 100 does not substantially receive power from the resonant antenna 201 of the power supply device 200.

Therefore, in one embodiment of the present invention, in the power receiving device 100, supply of power from the power supply device 200 can be stopped without a short-circuit between the pair of power supply points of the antenna element 107 of the resonant antenna 101. Therefore, in the power receiving device 100 in which charging is completed and supply of power is unnecessary, a circuit element, a wiring, and the like that are connected to the power receiving antenna 102 are charged and discharged, so that power consumption can be prevented. The stop of the supply of power from the power supply device 200 to the power receiving device 100 in which charging is completed can improve transmission efficiency of power supplied to another power receiving device while charging.

Note that the load 105 may include a power converter circuit for converting power outputted from the rectifier circuit 103 into power having a voltage or a current that is suitable for charging of the power storage device 114. As the power converter circuit, a DC-DC converter or the like can be used.

Further, in the power receiving device 100 in FIG. 5, as in the wireless power supply system in FIG. 1, the receiving circuit 106 may receive a signal including, as data, the cycle of the AC voltage applied from the transmitting circuit 205 through a group of antennas for supplying power. Alternatively, in the power receiving device 100 in FIG. 5, as in the wireless power supply system in FIG. 2, the receiving circuit 106 may receive a signal including, as data, the cycle of the AC voltage applied from the transmitting circuit 205 through a group of antennas different from the group of antennas for supplying power. Further alternatively, some of the antennas may belong to both of the group of antennas for supplying power and the group of antennas for transmitting and receiving a signal.

This embodiment can be implemented in appropriate combination with any of the other embodiments.

(Embodiment 3)

The present inventor measured loss of power transfer in wireless power supply from a power supply device to a power receiving device. In this embodiment, the results are described.

Figure 6A:
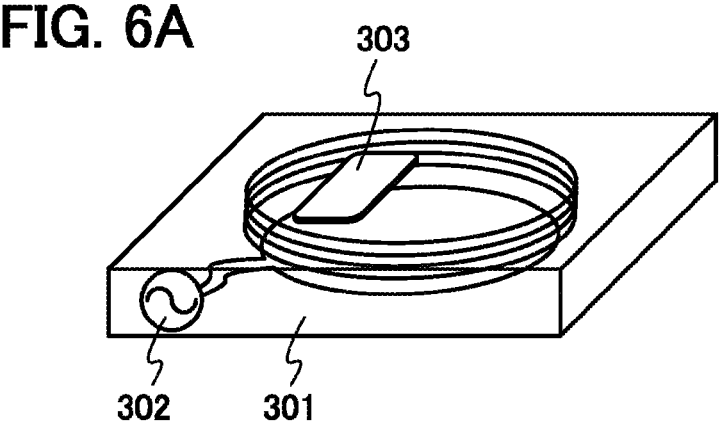
FIGS. 6A to 6C each illustrate conditions of an experiment.

The loss of power transfer was measured using different three conditions. Under a first condition, as shown in FIG. 6A, a power supply device 301 and a power receiving device 303 were used. In the power receiving device 303, it is estimated that the first operation was performed in a rectifier circuit. Under the first condition, the power receiving device 303 was arranged within a region where a radio wave outputted from the power supply device 301 could be received.

Figure 6B:
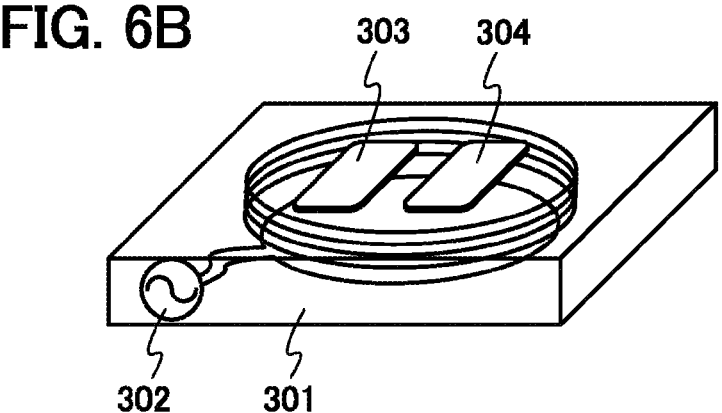

Under a second condition, as shown in FIG. 6B, the power supply device 301, the power receiving device 303, and a power receiving device 304 were used. In the power receiving devices 303 and 304, it is estimated that the first operation was performed in the rectifier circuit. Under the second condition, the power receiving devices 303 and 304 were arranged within a region where a radio wave outputted from the power supply device 301 could be received.

Figure 6C:
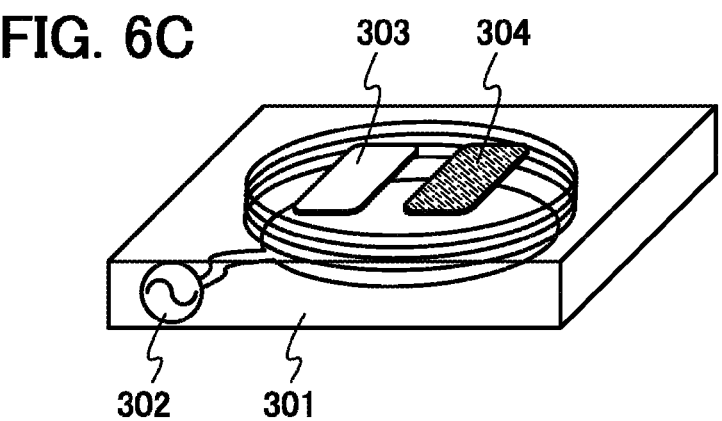

Under a third condition, as shown in FIG. 6C, the power supply device 301 and the power receiving devices 303 and 304 were used. In the power receiving device 303, the first operation was performed in the rectifier circuit. In the power receiving device 304, the second operation is performed in the rectifier circuit. Under the third condition, the power receiving devices 303 and 304 were arranged within a region where a radio wave outputted from the power supply device 301 could be received.

Further, under the first to third conditions, frequency f of AC voltage outputted from an AC power supply 302 of the power supply device 301 was changed from 11.56 MHz to 15.56 MHz; the loss of power transfer in wireless power supply from the power supply device 301 to the power receiving device 303 was measured.

Figure 7:
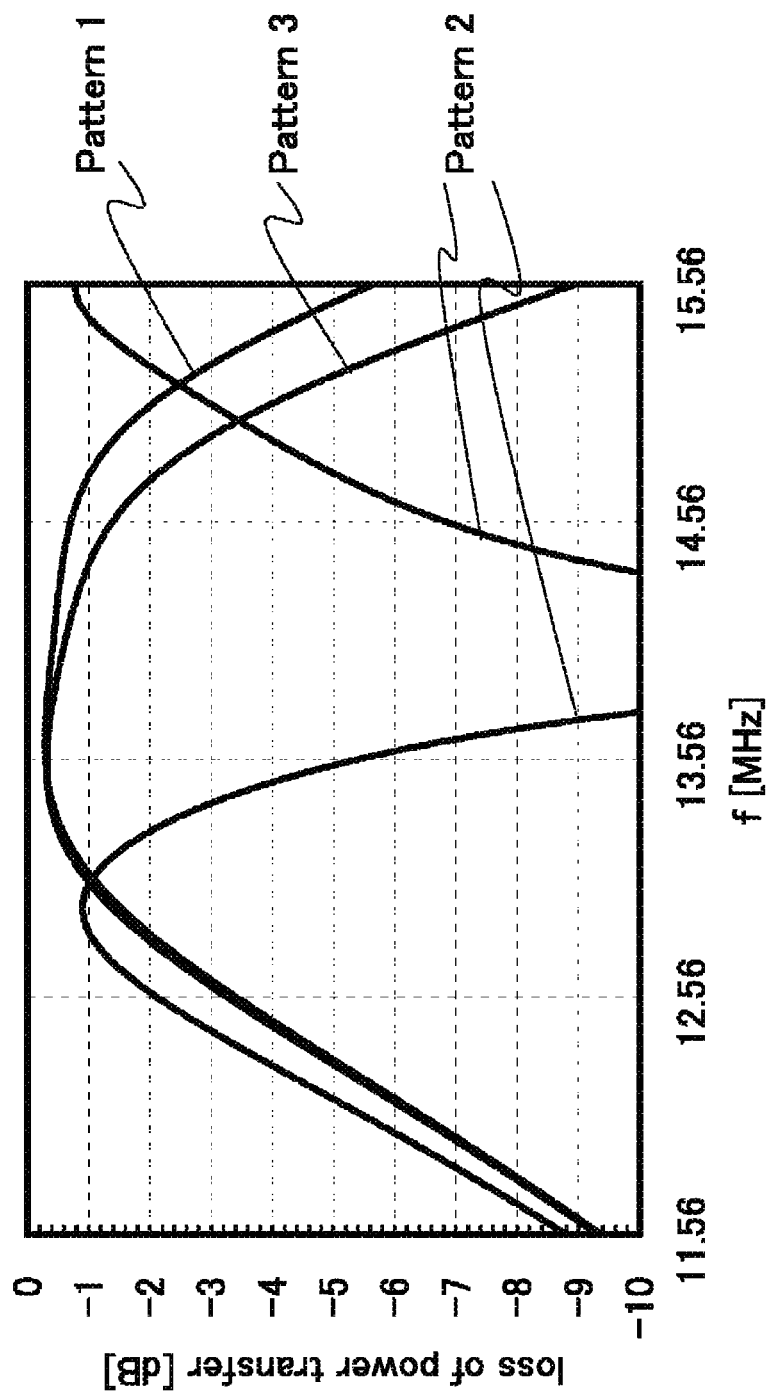
FIG. 7 illustrates a relation between loss of power transfer and frequency f.

FIG. 7 shows measurement values of the loss of power transfer (dB) with respect to the frequency f (MHz). In FIG. 7, a solid line denoted by Pattern 1 shows a relation between the frequency f (MHz) and the loss of power transfer (dB) under the first condition. A solid line denoted by Pattern 2 shows a relation between the frequency f (MHz) and the loss of power transfer (dB) under the second condition. A solid line denoted by Pattern 3 shows a relation between the frequency f (MHz) and the loss of power transfer (dB) under the third condition.

In FIG. 7, with the frequency f of 13.56 MHz, the loss of power transfer under the first condition (the solid line denoted by Pattern 1) is substantially equal to the loss of power transfer under the third condition (the solid line denoted by Pattern 3). Accordingly, it was proved that power transmission efficiency from the power supply device 301 to the power receiving device 303 is not largely changed depending on whether or not the power receiving device 304 in which the second operation is performed in the rectifier circuit exists within a region where a radio wave outputted from the power supply device 301 can be received.

Further, in FIG. 7, with the frequency f of 13.56 MHz, the loss of power transfer under the second condition (the solid line denoted by Pattern 2) is less than that under the other conditions. Accordingly, it was proved that the power transmission efficiency from the power supply device 301 to the power receiving device 303 is largely reduced when the power receiving device 304 in which the first operation is performed in the rectifier circuit exists within a region where a radio wave outputted from the power supply device 301 can be received.

This embodiment can be implemented in appropriate combination with any of the other embodiments.

(Embodiment 4)

In this embodiment, more specific structures of the power receiving device 100 and the power supply device 200 according to one embodiment of the present invention is described.

Figure 8:
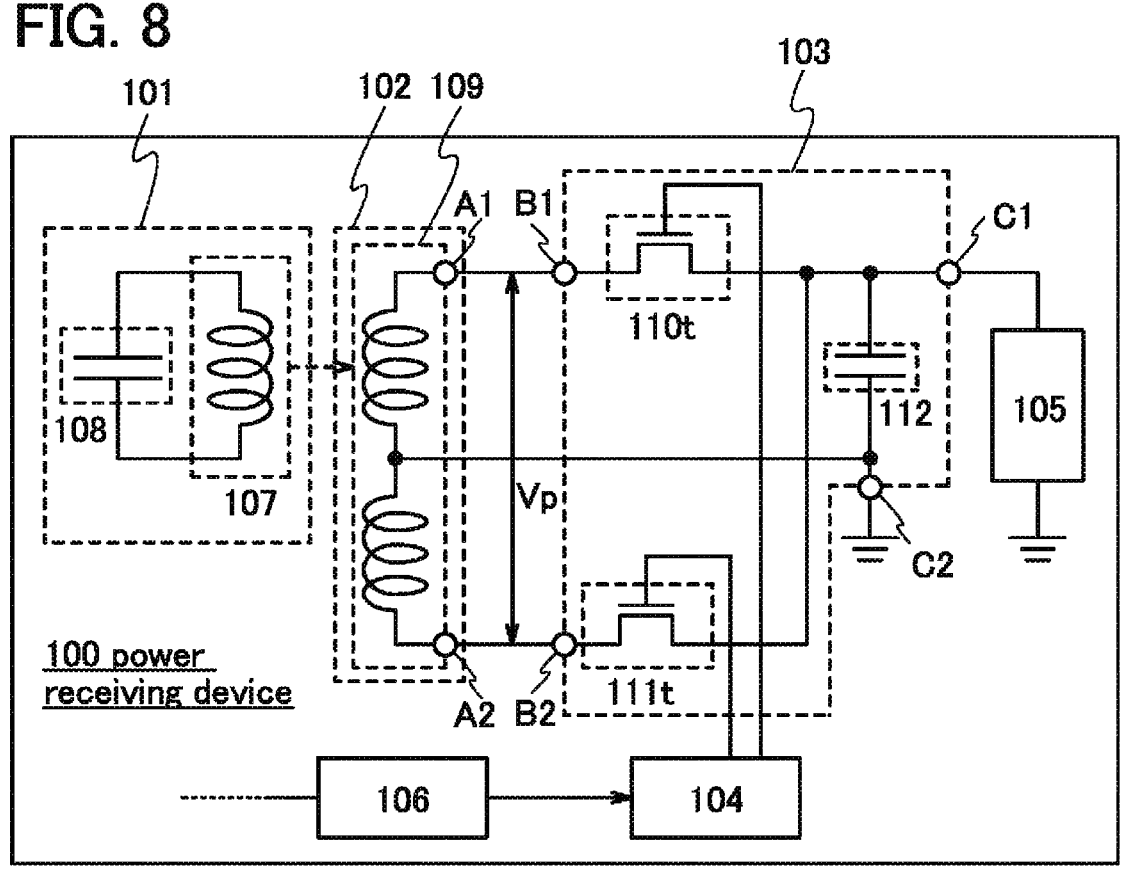
FIG. 8 illustrates a structure of a power receiving device.

FIG. 8 illustrates an example of a specific structure of the power receiving device 100. The power receiving device 100 includes the resonant antenna 101, the power receiving antenna 102, the rectifier circuit 103, the control circuit 104, the load 105, and the receiving circuit 106.

The resonant antenna 101 is shown in an equivalent circuit in which the antenna element 107 and the capacitor 108 are connected to each other.

The power supply points A1 and A2 of the power receiving antenna 102 are connected to the input terminals B1 and B2 of the rectifier circuit 103, respectively. Accordingly, the potential of the power supply point A1 is applied to the input terminal B1 and the potential of the power supply point A2 is applied to the input terminal B2.

Further, the rectifier circuit 103 includes a transistor 110*t* serving as the switch 110 and a transistor 111*t* serving as the switch 111. Furthermore, the rectifier circuit 103 includes the capacitor 112 in FIG. 8.

Note that although the case where one transistor 110*t* is used as the switch 110 is described as an example in FIG. 8, a plurality of transistors or a circuit element other than a transistor may be used as the switch 110. Further, although the case where one transistor 111*t* is used as the switch 111 is described as an example in FIG. 8, a plurality of transistors or a circuit element other than a transistor may be used as the switch 111.

One of a source terminal and a drain terminal of the transistor 110*t* is connected to the input terminal B1 and the other is connected to the output terminal C1. One of a source terminal and a drain terminal of the transistor 111*t* is connected to the input terminal B2 and the other is connected to the output terminal C1.

Note that a "source terminal" of a transistor means a source region that is part of an active layer or a source electrode that is connected to an active layer. Similarly, "drain terminal" of a transistor means a drain region that is a part of an active layer or a drain electrode connected to an active layer.

The control circuit 104 supplies a potential to a gate electrode of the transistor 110*t* and supplies a potential to a gate electrode of the transistor 111*t*. In this manner, the rectifier circuit 103 can perform either the first operation or the second operation in accordance with the potentials applied from the control circuit 104 to the gate electrode of the transistor 110*t* and the gate electrode of the transistor 111*t*.

One of electrodes of the capacitor 112 is connected to the output terminal C1 and the other of the electrodes of the capacitor 112 is connected to the output terminal C2. Further, a reference potential such as a ground potential is applied to the output terminal C2 and a potential difference between the output terminals C1 and C2 is smoothed by the capacitor 112. Accordingly, the smoothed potential difference between the output terminals C1 and C2 is applied to the load 105 as AC voltage.

Figure 9:
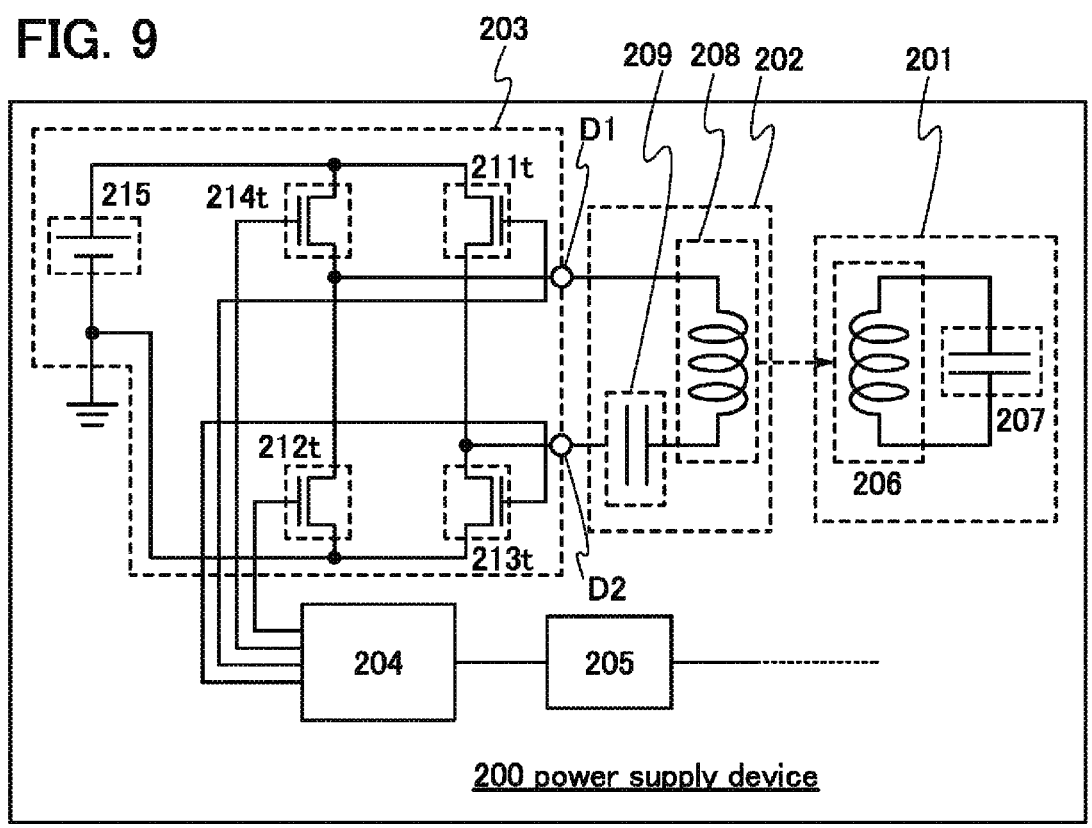
FIG. 9 illustrates a structure of a power supply device.

Next, FIG. 9 illustrates an example of a specific structure of the power supply device 200. The power supply device 200 includes the resonant antenna 201, the antenna 202, the AC power source 203, the control circuit 204, and the transmitting circuit 205.

The resonant antenna 201 is shown in an equivalent circuit in which the antenna element 206 and the capacitor 207 are connected to each other. The antenna 202 is shown in an equivalent circuit in which the antenna element 208 and the capacitor 209 are connected to each other.

The AC power source 203 includes a transistor 211*t*, a transistor 212*t*, a transistor 213*t*, and a transistor 214*t* serving as switches and a DC power source 215. One of a source terminal and a drain terminal of the transistor 211*t* is supplied with voltage from the DC power source 215 and the other is connected to an output terminal D2 of the AC power source 203. A potential from the DC power source 215 is higher than a reference potential such as a ground potential. One of a source terminal and a drain terminal of the transistor 212*t* is connected to an output terminal D1 of the AC power source 203 and the other is supplied with a reference potential such as a ground potential. One of a source terminal and a drain terminal of the transistor 213*t* is connected to the output terminal D2 of the AC power source 203 and the other is supplied with a reference potential such as a ground potential. One of a source terminal and a drain terminal of the transistor 214*t* is supplied with a potential from the DC power source 215 and the other is connected to the output terminal D1 of the AC power source 203.

The control circuit 204 supplies a potential to a gate electrode of each of the transistors 211*t* to 214*t*. The transistors 211*t* to 214*t* are ON or OFF, whereby the potential from the DC power source 215 and the reference potential are alternately applied to the output terminals D1 and D2 and AC voltage is applied between the output terminals D1 and D2. After that, the AC voltage is supplied to the antenna 202.

The control circuit 204 controls the potentials applied to the above gate electrodes, whereby the cycle of the AC voltage supplied from the AC power source 203 to the antenna 202 is controlled.

Figure 10A:
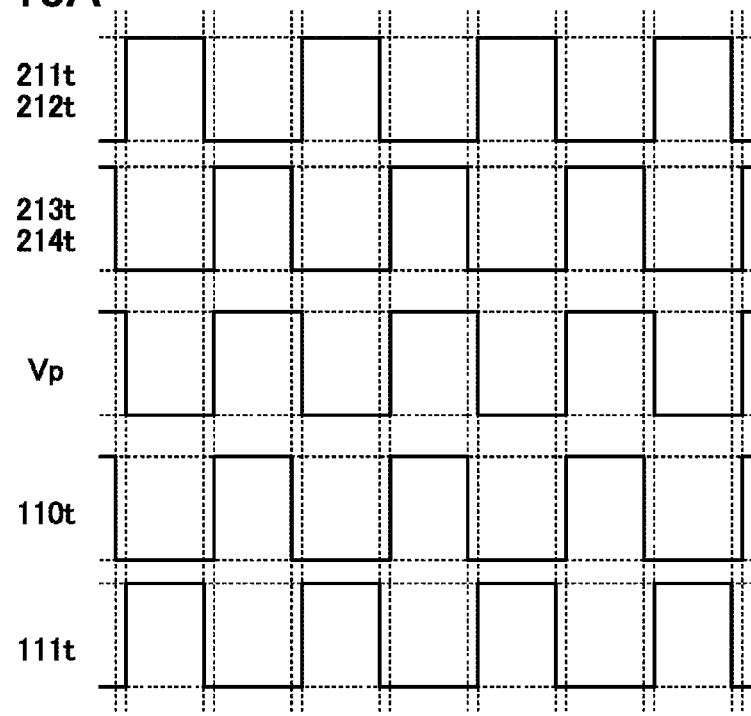
FIGS. 10A and 10B each show a timing chart.
Figure 10B:
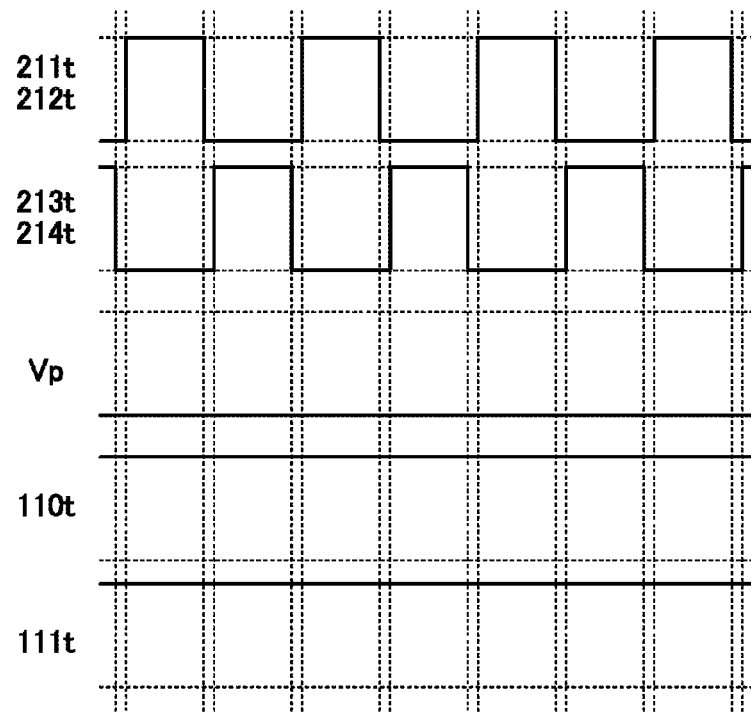

Next, an operation example of the power receiving device 100 in FIG. 8 and the power supply device 200 in FIG. 9 is described using timing charts in FIGS. 10A and 10B. Note that an example in which n-channel transistors are used for all of the transistors 110*t* and 111*t* and the transistors 211*t* to 214*t* is described in FIGS. 10A and 10B.

In the case where the first operation is performed in the rectifier circuit 103 of the power receiving device 100, the transistors 110t and 111t and the transistors 211t to 214t operate in accordance with the timing chart in FIG. 10A. In FIG. 10A, a potential difference between the power supply points A1 and A2 when the potential of the power supply point A2 is regarded as a reference potential in the power receiving antenna 102 is shown as voltage $V_p$.

According to the timing chart in FIG. 10A, when the potential applied to the gate electrode of each of the transistors 211t and 212t is a high-level potential, the potential applied to the gate electrode of each of the transistors 213t and 214t is a low-level potential. That is, when the transistors 211t and 212t are ON, the transistors 213t and 214t are OFF.

By the above operation, the reference potential is applied to the output terminal D1 and the potential from the DC power source 215 is applied to the output terminal D2. Therefore, when the potential of the output terminal D2 is regarded as a reference potential, the voltage between the output terminals D1 and D2 is low-level voltage. Further, the voltage between the output terminals D1 and D2 is applied to the power supply points A1 and A2 through the antenna 202, the resonant antenna 201, the resonant antenna 101, and the power receiving antenna 102; therefore, the voltage $V_p$ is low-level voltage.

Further, according to the timing chart in FIG. 10A, when the potential applied to the gate electrode of each of the transistors 211t and 212t is a low-level potential, the potential applied to the gate electrode of each of the transistors 213t and 214t is a high-level potential. That is, when the transistors 211t and 212t are OFF, the transistors 213t and 214t are ON.

By the above operation, the potential from the DC power source 215 is applied to the output terminal D1 and the reference potential is applied to the output terminal D2. Therefore, when the potential of the output terminal D2 is regarded as a reference potential, the voltage between the output terminals D1 and D2 is high-level voltage. Further, the voltage between the output terminals D1 and D2 is applied to the power supply points A1 and A2 through the antenna 202, the resonant antenna 201, the resonant antenna 101, and the power receiving antenna 102; therefore, the voltage $V_p$ is high-level voltage.

Further, according to the timing chart in FIG. 10A, when the voltage $V_p$ is low-level voltage, that is, when the potential of the power supply point A2 is higher than that of the power supply point A1, the potential applied to the gate electrode of the transistor 110t is a low-level potential and the potential applied to the gate electrode of the transistor 111t is a high-level potential. That is, the transistor 110t is OFF and the transistor 111t is ON. Accordingly, the potential of the power supply point A2, which is higher than that of the power supply point A1, is applied to the output terminal C1 through the transistor 111t.

Further, according to the timing chart in FIG. 10A, when the voltage $V_p$ is high-level voltage, that is, when the potential of the power supply point A1 is higher than the potential of the power supply point A2, the potential applied to the gate electrode of the transistor 110t is a high-level potential and the potential applied to the gate electrode of the transistor 111t is a low-level potential. That is, the transistor 110t is ON and the transistor 111t is OFF. Accordingly, the potential of the power supply point A1, which is higher than that of the power supply point A2, is applied to the output terminal C1 through the transistor 110t.

By the above first operation, a potential that is higher than the potential of the output terminal C2 is applied to the output terminal C1. That is, by the above first operation, the AC voltage $V_p$ applied between the power supply points A1 and A2 is rectified and then DC voltage is applied between the output terminals C1 and C2. The DC voltage applied between the output terminals C1 and C2 is supplied to the load 105.

In the above first operation, the switching of ON and OFF of the transistors 110t and 111t can be determined in the control circuit 104 in accordance with the cycle of the AC voltage outputted from the AC power source 203 of the power supply device 200.

Further, in the case where the second operation is performed in the rectifier circuit 103 of the power receiving device 100, the transistors 110t and 111t and the transistors 211t to 214t operate in accordance with the timing chart in FIG. 10B. Also in FIG. 10B, a potential difference between the power supply points A1 and A2 when the potential of the power supply point A2 is regarded as a reference potential in the power receiving antenna 102 is shown as voltage $V_p$.

The operations of the transistors 211t to 214t of the power supply device 200 in the case where the first operation is performed are the same as those in the case where the second operation is performed. Therefore, when the transistors 211t to 214t operate in accordance with the timing chart in FIG. 10B, low-level voltage and high-level voltage are alternately applied between the output terminals D1 and D2.

Further, according to the timing chart in FIG. 10B, the potential applied to the gate electrode of each of the transistors 110t and 111t remains to be high-level. That is, the transistors 110t and 1ilt remain to be ON. Therefore, the power supply points A1 and A2 are short-circuited and thus the voltage $V_p$ is substantially equal to zero. Even when low-level voltage and high-level voltage are alternately applied between the output terminals D1 and D2, supply of power to a circuit element or a wiring that is connected to the power receiving antenna 102, specifically, the capacitor 112 in the rectifier circuit 103, the circuit elements forming the load 105, the wiring provided in the rectifier circuit 103 or the load 105, and the like is stopped. Therefore, the resonant antenna 101 of the power receiving device 100 does not substantially receive power from the resonant antenna 201 of the power supply device 200.

Therefore, in one embodiment of the present invention, in the power receiving device 100, supply of power from the power supply device 200 can be stopped without a short-circuit between the pair of power supply points of the antenna element 107 of the resonant antenna 101. Further, the stop of the supply of power from the power supply device 200 to the power receiving device 100 in which charging is completed can improve power transmission efficiency from the power supply device 200 to another power receiving device.

Note that, in the power receiving device 100 in FIG. 8 and the power supply device 200 in FIG. 9, as in the wireless power supply system in FIG. 1, the receiving circuit 106 may receive a signal including, as data, the cycle of the AC voltage applied from the transmitting circuit 205 through a group of antennas for supplying power. Alternatively, in the power receiving device 100 in FIG. 8 and the power supply device 200 in FIG. 9, as in the wireless power supply system in FIG. 2, the receiving circuit 106 may receive a signal including, as data, the cycle of the AC voltage applied from the transmitting circuit 205 through a group of antennas different from the group of antennas for supplying power. Further alternatively, part of the antennas may belong to both of the group of antennas for supplying power and the group of antennas for transmitting and receiving a signal.

This embodiment can be implemented in appropriate combination with any of the other embodiments.

(Embodiment 5)

A power receiving device according to one embodiment of the present invention is an electronic apparatus that can wirelessly receive external power. Specific examples of the power receiving device according to one embodiment of the present invention include display devices, laptops, image reproducing devices provided with recording media (typically, devices which reproduce the content of recording media such as digital versatile discs (DVDs) and have displays for displaying reproduced images), cellular phones, portable game machines, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like.

A power receiving device according to one embodiment of the present invention may be a moving object powered by an electric motor. The moving object is a motor vehicle (a motorcycle or an ordinary motor vehicle with three or more wheels), a motor-assisted bicycle including an electric bicycle, an airplane, a vessel, a rail car, or the like.

The case where power is wirelessly supplied from a power supply device to a plurality of moving objects that can wirelessly receive external power is described in this embodiment.

Figure 11A:
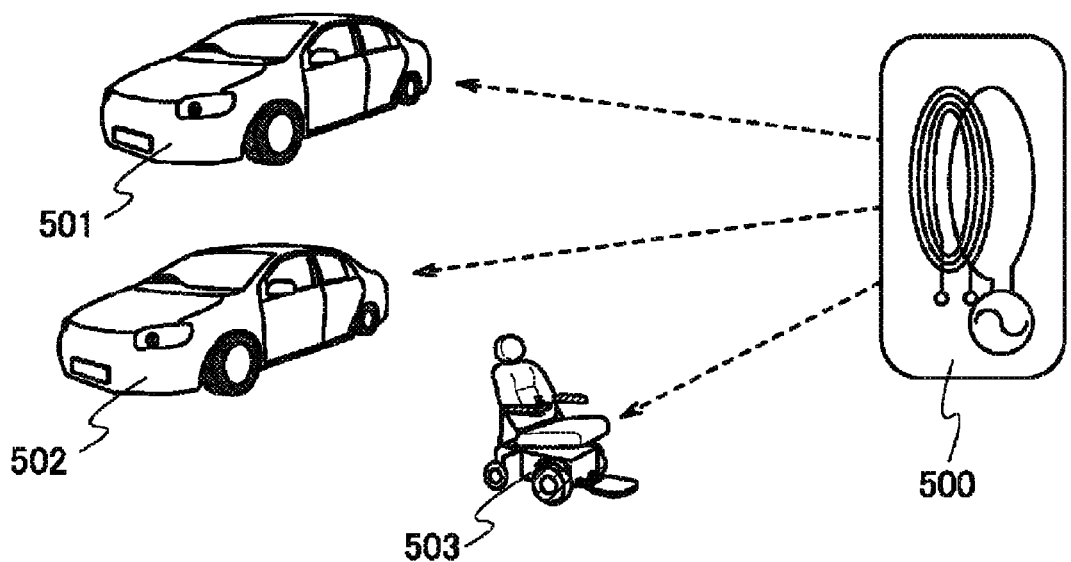
FIGS. 11A and 11B each illustrate a state of wireless power supply.

First, as shown in FIG. 11A, power is supplied from a power supply device 500 to an ordinary motor vehicle 501, an ordinary motor vehicle 502, and an electric wheelchair 503 by electromagnetic resonant wireless power supply. The ordinary motor vehicle 501, the ordinary motor vehicle 502, and the electric wheelchair 503 each include a power storage device and a charge control circuit as a load. Part of power supplied from the power supply device 500 is stored in the power storage device in each of the ordinary motor vehicle 501, the ordinary motor vehicle 502, and the electric wheelchair 503.

As shown in FIG. 11A, while the wireless power supply is performed, the rectifier circuit in each of the ordinary motor vehicle 501, the ordinary motor vehicle 502, and the electric wheelchair 503 performs the first operation.

Figure 11B:
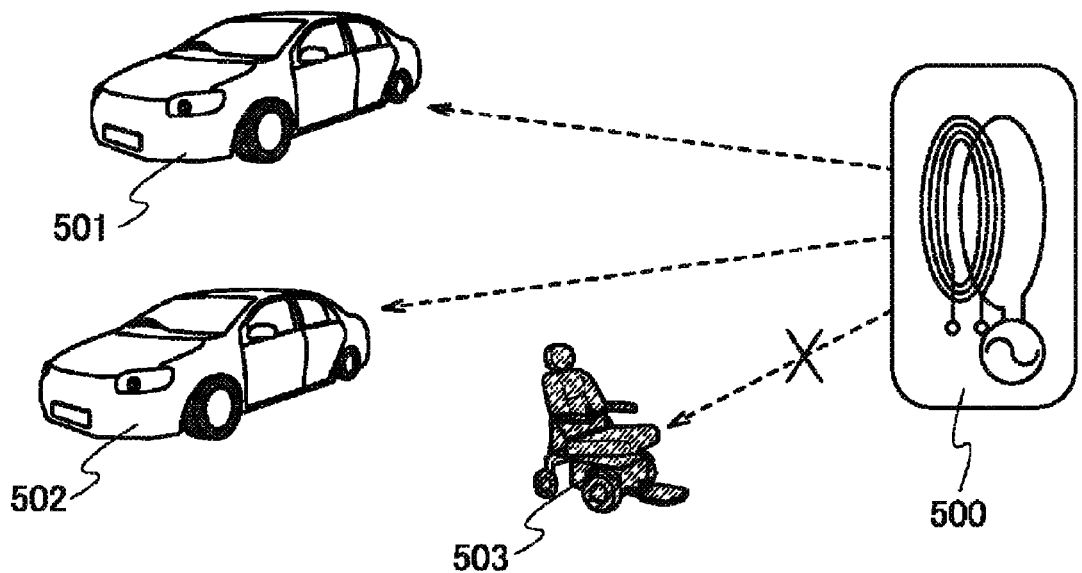

After that, for example, when the power storage device in the electric wheelchair 503 is fully charged, the operation of the rectifier circuit in the electric wheelchair 503 is switched from the first operation to the second operation in response to a signal from the charge control circuit. Then, the stop of the supply of power from the power supply device 500 to the electric wheelchair 503 in which charging is completed can improve power transmission efficiency from the power supply device 500 to the ordinary motor vehicle 501 and the ordinary motor vehicle 502 (see FIG. 11B).

This embodiment can be implemented in appropriate combination with any of the other embodiments.

This application is based on Japanese Patent Application serial no. 2011-282434 filed with Japan Patent Office on Dec. 23, 2011, the entire contents of which are hereby incorporated by reference.

What is claimed is:
1. A power receiving device comprising:
a first antenna configured to form resonant coupling and receive first power through the resonant coupling;
a second antenna comprising a first power supply point and a second power supply point and configured to form electromagnetic induction coupling with the first antenna and receive second power from the first antenna through the electromagnetic induction coupling with the first antenna;
a rectifier circuit configured to generate DC voltage by rectifying AC voltage through the first antenna and the second antenna;
a load to which the DC voltage outputted from the rectifier circuit is applied; and
a control circuit configured to control whether or not the first power supply point and the second power supply point are short-circuited with each other.

2. The power receiving device according to claim 1, further comprising a receiving circuit configured to extract a signal including a cycle from AC voltage received by the second antenna as data, and supply the signal to the control circuit.

3. The power receiving device according to claim 1, wherein the load comprises a power storage device configured to be charged with the DC voltage and a charge control circuit configured to send notification to the control circuit when the charging is completed in the power storage device, and
wherein the control circuit is configured to generate a signal for controlling the rectifier circuit so that the DC voltage is not generated by the rectifier circuit when the charging is completed in the power storage device.

4. The power receiving device according to claim 3, wherein the power storage device comprises a secondary battery including any one of a lead-acid battery, a nickel-cadmium battery, a nickel-hydride battery and a lithium-ion battery.

5. The power receiving device according to claim 3, wherein the power storage device is an electric double layer capacitor or a hybrid capacitor which comprises a first electrode which is capable of forming an electric double layer structure and a second electrode which is capable of undergoing an oxidation-reduction reaction when the power storage device is charged.

6. A power receiving device comprising:
a first antenna configured to form resonant coupling and receive first power through the resonant coupling;
a second antenna comprising a first power supply point and a second power supply point and configured to form electromagnetic induction coupling with the first antenna and receive second power from the first antenna through the electromagnetic induction coupling with the first antenna;
a rectifier circuit comprising a first switch and a second switch, the rectifier circuit being configured to generate DC voltage by rectifying AC voltage through the first antenna and the second antenna;
a load to which the DC voltage outputted from the rectifier circuit is applied; and
a control circuit configured to control ON or OFF of the first switch and the second switch,
wherein the control circuit is configured so that the DC voltage is generated by the rectifier circuit in the case where one of the first switch and the second switch is ON and the other of the first switch and the second switch is OFF, and
wherein the control circuit is configured so that the DC voltage is not generated by the rectifier circuit in the case where both of the first switch and the second switch are ON and the first power supply point and the second power supply point are short-circuited with each other through the first switch and the second switch.

7. The power receiving device according to claim 6, further comprising a receiving circuit configured to wirelessly receive a first signal comprising a data of a cycle of the AC voltage from the second antenna,
wherein the control circuit is configured to generate a second signal for selecting ON or OFF of the first switch and the second switch in response to the first signal.

8. The power receiving device according to claim 6, wherein the load comprises a power storage device configured to be charged with the DC voltage and a charge control circuit configured to send notification to the control circuit when the charging is completed in the power storage device, and
wherein the control circuit is configured to generate a signal for controlling the rectifier circuit so that the DC voltage is not generated by the rectifier circuit when the charging is completed in the power storage device.

9. The power receiving device according to claim 8, wherein the power storage device comprises a secondary battery including any one of a lead-acid battery, a nickel-cadmium battery, a nickel-hydride battery and a lithium-ion battery.

10. The power receiving device according to claim 8, wherein the power storage device is an electric double layer capacitor or a hybrid capacitor which comprises a first electrode which is capable of forming an electric double layer structure and a second electrode which is capable of undergoing an oxidation-reduction reaction when the power storage device is charged.

11. The power receiving device according to claim 6, further comprising a receiving circuit configured to extract a signal including a cycle from AC voltage received by the second antenna as data, and supply the signal to the control circuit.

12. A power receiving device comprising:
a load;
a rectifier circuit comprising a first switch, a second switch, a first output terminal, and a second output terminal;
a first antenna comprising:
a first power supply point connected to the load through the first switch and the first output terminal; and
a second power supply point connected to the load through the second switch and the second output terminal; and
a control circuit configured to control whether or not the first power supply point and the second power supply point are short-circuited with each other through the first switch and the second switch.

13. The power receiving device according to claim 12,
wherein the control circuit is configured to control whether the rectifier circuit performs a first operation or a second operation,
wherein, in the first operation, one and the other of the first switch and the second switch alternately and repeatedly turn ON and OFF, and
wherein, in the second operation, the first switch and the second switch turn ON so that the first power supply point and the second power supply point are short-circuited with each other.

14. The power receiving device according to claim 13, wherein, the first switch and the second switch are configured to turn ON and OFF in accordance with a cycle of an AC voltage applied between the first power supply point and the second power supply point in the first operation.

15. The power receiving device according to claim 12, wherein the load is a power storage device.

16. The power receiving device according to claim 15, wherein the power storage device is a secondary battery or a capacitor.

17. The power receiving device according to claim 12, comprising a receiving circuit configured to extract a signal including a cycle from AC voltage received by the first antenna.

18. The power receiving device according to claim 12, comprising a second antenna a receiving circuit configured to extract a signal including a cycle from AC voltage transmitted from the second antenna.

19. The power receiving device according to claim 12, comprising a second antenna configured to form an electromagnetic induction coupling with the first antenna.

* * * * *